April 23, 1957 W. H. SOLOMON 2,789,606
BREAD SLICING MACHINE
Filed Oct. 15, 1954 4 Sheets-Sheet 1

INVENTOR.
William H. Solomon
BY
Frank E. Liverance, Jr.
Attorney

April 23, 1957 W. H. SOLOMON 2,789,606
BREAD SLICING MACHINE
Filed Oct. 15, 1954 4 Sheets-Sheet 2

FIG. 2.

INVENTOR.
William H. Solomon
BY
Frank E. Liveranse Jr.
Attorney

April 23, 1957     W. H. SOLOMON     2,789,606
BREAD SLICING MACHINE
Filed Oct. 15, 1954     4 Sheets-Sheet 4

FIG. 4.

INVENTOR.
William H. Solomon
BY
Frank E. Liverance, Jr.
Attorney

United States Patent Office 2,789,606
Patented Apr. 23, 1957

2,789,606

BREAD SLICING MACHINE

William H. Solomon, Grand Rapids, Mich., assignor to Oliver Machinery Company, Grand Rapids, Mich., a corporation of Michigan Application October 15, 1954, Serial No. 462,433

12 Claims. (Cl. 146—151)

The present invention relates to a bread slicing machine of the type in which single loaves may be sliced, one after another, with any desired intervals of time between the slicing of loaves.

It is an object and purpose of the present invention to provide a semi-automatic slicing machine, the operation of the slicing knives and of a clamping holder for a loaf of bread being simultaneously started, both being operated by an electric motor which is started in operation by the manual closing of a switch in a circuit in which the motor is located. The motor operates a hydraulic pump which as soon as it begins to operate moves a clamp into engagement with the loaf to hold it securely but with a limited clamping force, and substantially simultaneously hydraulically moves a loaf carrier which carries the clamp to a position such that the loaf is brought to and past the slicing knives. After the movement of the loaf relative to the knives has gone a sufficient distance that the bread is sliced transversely into a plurality of slices, a stopping of the motor, and of the pump and slicing knives actuated thereby, automatically takes place followed by the actuation of valves mechanism which releases the hydraulic liquid which has been pumped to operate the clamp and movable load support for a reversal of the flow of the liquid and return of the parts to initial position, conditioning the machine for a succeeding cycle of operations for slicing the next loaf or other equivalent food material which is to be sliced.

The invention has been embodied in a practical, serviceable and very effective machine to accomplish the results and ends stated. The machine may also be stopped by a manual operation of an additional switch should a loaf of bread in the course of its being sliced be distorted or improperly clamped, or for any reason, a transverse slicing of the loaf into slices would be defective.

An understanding of the invention for the attainment of the results stated and of an embodiment of the invention which has been produced, manufactured and sold, may be had from the following description, taken in connection with the accompanying drawings, in which, Fig. 1 is a plan view of the machine of my invention with parts broken away for a better disclosure of structure.

Fig. 2 is a longitudinal vertical section from front to rear taken substantially on the plane of the broken line 2—2 of Fig. 1, looking in the direction indicated and with the parts at starting position.

Fig. 4 is a view diagrammatically illustrating the electric circuits and the hydraulic mechanism used in the operation of the machine of my invention.

Like reference characters refer to like parts in the different figures of the drawings.

Figure 3:
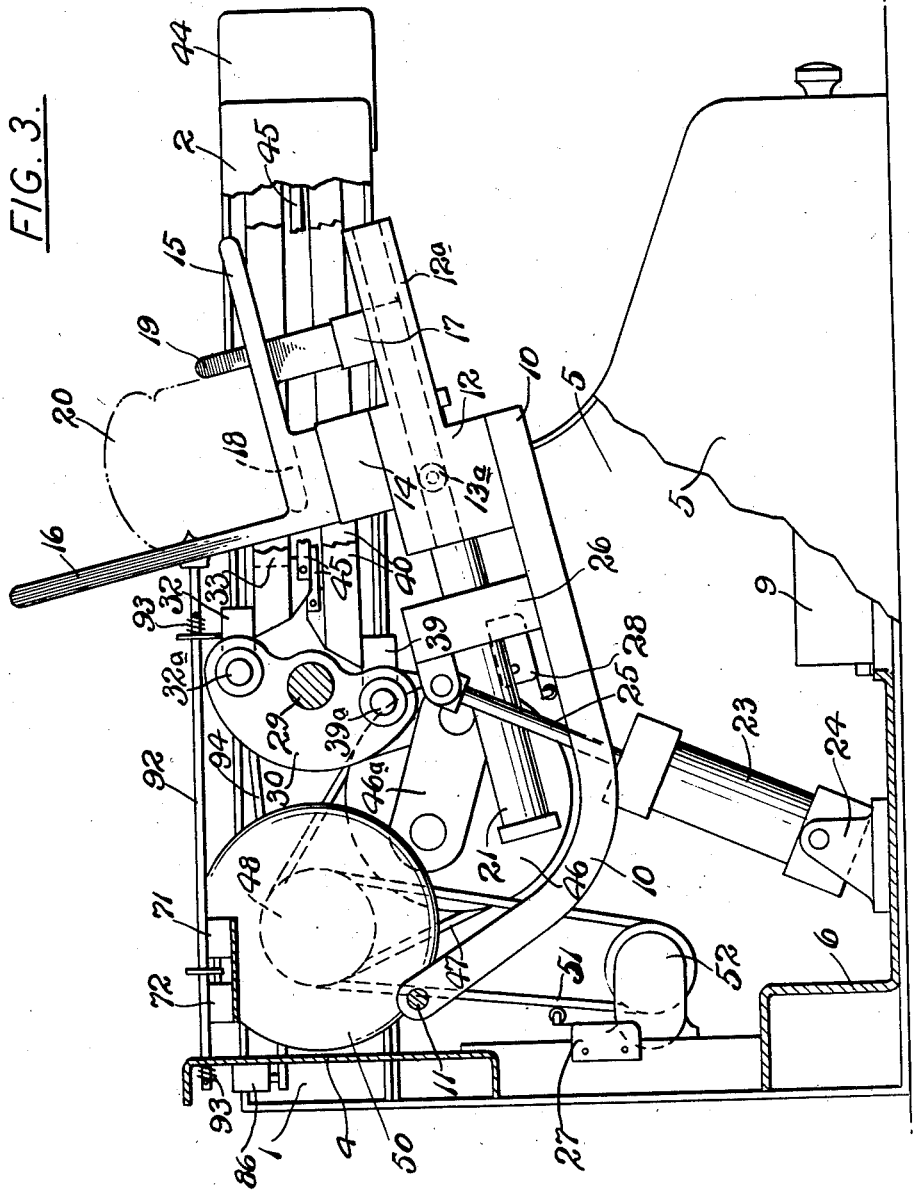
Fig. 3 is a like sectional view after the machine has been operated to bring a bread loaf to the slicing knives for transverse slicing thereof.

In the construction shown, a rectangular frame has a frame member of U-shape with parallel spaced opposite sides 1 and 2 connected at their front by a cross member 3, such parts 1, 2 and 3 preferably being of channel cross section and having a wider channel cross member 4 secured at the rear ends of the sides 1 and 2. Such frame is positioned horizontally at the upper ends of and supported by two spaced sides 5 each located one under each of the sides 1 and 2 of the upper frame. At their lower rear portions such sides 5 are connected by a cross connecting member 6 of the shape best shown in Fig. 3, and adjacent their front lower portions by cross members 7 and 8, there being a drawer receiving space between said members 7 and 8 for the reception and removal of a crumb drawer or tray 9 (Fig. 2).

A loaf carrier is mounted upon and between said sides 5 of the housing support of the machine. Such carrier includes two bent arms 10, one adjacent each side of the machine, pivotally mounted at 11 at their rear ends. In the initial position of the parts, as in Fig. 2, arms 10 extend downwardly for a distance and are then bent to extend downwardly and forwardly. Supports 12 are permanently secured to and located above the front ends of the arms 10, each having a forwardly extending guide 12a on which bars 13 are movably mounted on rollers 13a as in Fig. 2, for back and forth movement on said guides. A cross bar 14 extends between the members 12. The bar 14 at its upper side carries one part or member of the loaf holding clamp. Such loaf holding member comprises a large number of thin closely spaced arms 15 which extend downwardly and forwardly and at their rear ends have integral therewith upwardly extending members 16 at right angles thereto. The loaf holding clamp further includes a cross bar 17 extending between and located above the front end portions of the bars 13 at the upper side of which are a plurality of thin closely spaced complementary and cooperating loaf clamping members, each having an upwardly extending finger 19 and a rearwardly extending finger 18, the parts 18 and 15 lying alongside each other. A loaf of bread, shown in dashed lines at 20 in Fig. 2, when placed in the machine at its front side will rest upon the fingers 15 and 18.

Such front member of the loaf clamp including the bars 13 and 17 and the loaf engaging parts 18 and 19, at the initial start of the machine is forwardly positioned as far as it can go, but on moving this movable clamp member to the rear the rear side of the loaf will be brought against the upwardly extending parts 16 of the rear members of the loaf clamp. Such movement is accomplished by a cylinder and piston rod apparatus which includes a cylinder 21 and a piston rod 22 extending therefrom connected to the front loaf clamping member. The cylinder is located back of and carried by the rear relatively fixed loaf clamping structure and moves with the loaf and the clamp which holds the loaf on upward swinging movement of the bars 10 about their pivots 11. Such upward swinging movement is by a second piston cylinder apparatus, the cylinder at 23 having a pivotal connection to a supporting bracket 24 in the lower rear portion of the housing of the machine, the piston rod 25 thereof passing through the upper end of the cylinder and having connection to a cross bar 26 between the arms 10. On extension of the piston rod upwardly, the loaf carrier and the loaf clamp are swung upwardly about such pivots 11. The cylinders 21 and 23 having the usual pistons therein connected to the piston rods 22 and 25 receive liquid therein pumped under pressure in accordance with mechanism which will be hereafter described.

In the raising and lowering of the arms 10 make and break switches 27 and 28 are operated. The switch at 27 which normally closes, is opened (Fig. 2) by the arms 10 at lowermost position. The switch 28 which is normally closed when free, as in Fig. 2, is opened when the arms 10 are moved to uppermost position as in Fig. 3. Such switches and their locations in electric circuits form a part of the control structure in the present invention which will be later described.

At the upper portion of the machine a cross shaft 29 between the sides 1 and 2 of the upper frame is mounted for rocking movement. On the shaft 29 rocker plates 30 spaced from each other are secured. An upper slicer knife carrying frame has a rear cross bar 31 from which arms 32 terminating in journals extend upwardly and to the rear. Through the journals a shaft 32a passes at its ends being mounted for rocking movement at the upper end portions of the rocker plates 30. Such upper frame is completed by two spaced horizontal sides 33 and an outer transverse bar 34 parallel to the rear bar 31. Adjacent the middle portion of the front bar 34 an angle member 35 is secured extending forwardly a short distance and then downwardly, to the lower end of which links 36 are pivotally connected which, at their upper ends, are pivotally mounted on a cross rod 37. The pivotal axis of the rod 37 is forward of and in approximately the same horizontal plane as the axis of the shaft 32a.

A lower slicer knife carrying frame has a rear transverse bar 38 generally parallel to the bar 31 which, through arms 39 terminating in journals, is carried by a second shaft 39a passing through the journals of the parts 39. The shaft 39a is at the lower end portions of and extends between the rocker plates 30. Such lower frame is completed by two spaced horizontal side bars 40 and a transverse bar 41 at their front ends below the bar 34 of the upper frame. Such lower frame at its front end and near the middle portion of the front bar 41 has an outwardly extending angle member 42 with an upwardly turned free end portion, links 36a connected thereto and extending downwardly and having pivotal connection to a pivot rod 43. Parts 35 and 42 pass through an opening therefor in the front member 3 of the upper rectangular frame and at their outer ends are housed within a sheet metal housing 44.

Thin slicer knives 45 are connected to and depend from the front and rear cross bars of the upper frame and are also connected to upwardly extending projections from the cross bars 38 and 41 of the lower frame as shown in Fig. 2. The two series of knives 45, each comprising a plurality of spaced parallel slicing knives, are properly spaced with respect to each other that when a loaf of bread or the like is moved upwardly as in Fig. 3 to and past such knives the loaf is transversely cut into a series of slices of bread of proper thickness from one end thereof to the other. The parts 15, 16, 18 and 19 are properly located and spaced that they will pass between the knives on such upward movement.

Figure 1:
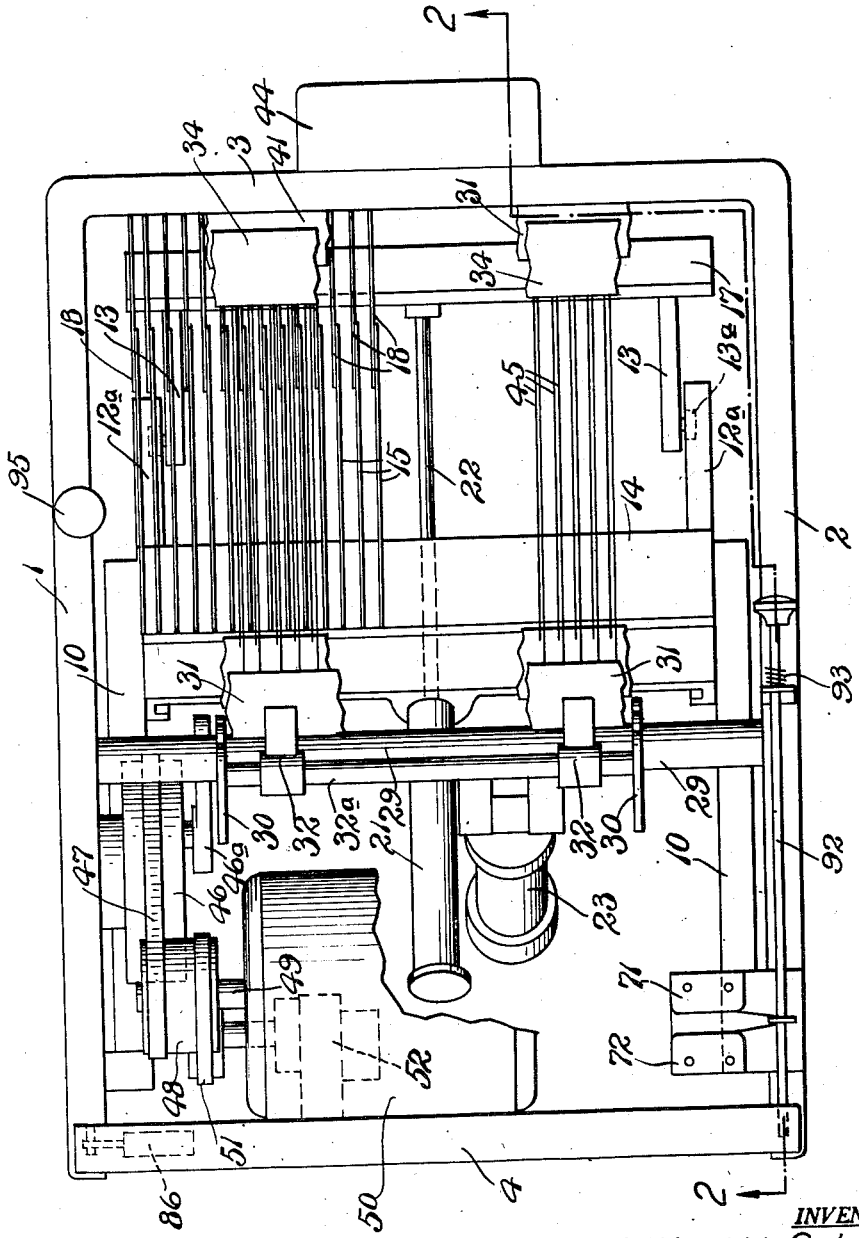

A disk or wheel 46 mounted for rotative movement has a link 46a (Fig. 2) pivotally connected to said disk at one end at a distance from the center of the disk. At the other end said link has a connection to the rocking mechanism including the shaft 29 and rocker plates 30 so that on continuous rotating of the disk 46 the slicing knives are rapidly reciprocated together with a rocking or sweeping movement to get the best slicing or cutting action thereof against a loaf of bread brought to them. The disk 46 is driven by an endless belt 47 from a drive pulley 48 on the shaft 49 of an electric motor 50 (Fig. 1). The motor is located at the upper rear portion of the machine and the disk 46 is mounted on one of the sides 5 of the housing thereof. The driving pulley 48 also has a second endless belt 51 driven thereby which extends downwardly to and drives a liquid or hydraulic pump 52. The pump is driven continuously at all times while the motor is running the same as the two series of knives 45 are reciprocated, in opposite directions during such motor operation.

As illustrated in Fig. 4, liquid supplied to the pump 52 comes from a supply tank 53 through a pipe 54 in the length of which the pump 52 is positioned. At the outlet side of the pump the pipe 54 carries the liquid pumped to a branch pipe 55 which leads to the rear end of the cylinder 21. At the juncture of the pipes 54 and 55 is a continuation of the pipe 55 in the opposite direction as at 56. Pipe 56 leads back to the supply tank 53. In the length thereof a solenoid operated valve 57 is interposed, housed in a valve housing 58. An armature 57a is connected with the valve and passes through a solenoid coil which is in an electric circuit hereafter described. The valve 57 may be of any selected type, operating as diagrammatically disclosed to prevent flow of liquid through the pipe 56 back to the supply tank 53 when in one position but when moved to another position, that is, elevated in Fig. 4 so that the annular groove therearound is in conjunction with the adjacent ends of the pipe 56, flow of liquid back to the supply tank is not obstructed.

A branch 59 from the pipe 55 has in the length thereof a restriction valve mechanism at 60 and therebeyond a check valve 61. The opposite end of the pipe 59 leads to a conduit 62, one end of which reaches to and communicates with the lower end of the cylinder 23. In the opposite direction from the connected end of the pipe 59 the pipe or conduit 62 leads to the supply tank. A second valve 64 of the same type as valve 57, with an armature 64a for operative connection with a solenoid winding, is in the pipe 62 between the cylinders 21 and 23. From the pipe 62 a connecting pipe 65 leads to the rear end of cylinder 21. Between such connection 65 and the supply tank in the pipe 62 a second restricting mechanism at 66 is interposed. The flow of liquid through the pipe 62 may be governed by any suitable manually operable valve or other mechanism for such purpose. Such mechanism at 66 is set at the factory before the machine is delivered to the purchaser. The like fluid control or restricting mechanism at 60 is designed for operation by the operator of the machine when it is used. Liquid flow through the pipe 59 controls the cycle time of machine operation, being increased in time when the flow is restricted and decreased and diminished in time when the flow through pipe 59 is increased.

Electric current passing through lead wires 67 goes to one circuit having a circuit wire 68 connected with one of the lead wires 67 and leading to one side of the motor 50, a make and break switch 69 being interposed in such wire 68. The other wire 70 of such circuit leads to the other side of the motor 50. The previously described normally closed switch 28 is in the circuit wire 70 together with two other switches 71 and 72, the latter of which, if opened, will break the circuit. The switch 71 normally open, upon being manually closed momentarily, will complete a relay circuit. Such relay circuit includes a wire 73 branching from a circuit wire 68 in the length of which a solenoid winding 74 is interposed and leading to the wire 75 having a switch 76 at one end which is the companion or parallel switch to the previously described switch 69 and is simultaneously opened and closed therewith by the movement of the armature 77 which extends through the solenoid winding 74. When the switch 76 together with the switch 69 is moved to closed position the relay circuit for maintaining the switches 69 and 76 closed is completed by the wire 78 leading to and having connection to the motor circuit wire 70.

It is evident that with a manual closing of the switch 71 winding 74 is energized, both switches 69 and 76 of the relay are closed and there is a completion of the circuit supplying the motor with electric current. The relay circuit through the wires 73, winding 74 and wires 75 and 78 is closed so that the relay switches 69 and 76 remain in closed position until the circuit is broken, when switch 28 is opened upon the loaf carrying mechanism being lifted to upper position to reach such switch 28 and open it; whereupon the motor 50 stops.

A second electric circuit is provided, fed by the feed wires 67. It includes a circuit wire 79 which terminates at one switch 80 of a second relay. Interposed in the length of the wire 79 is the previously described switch 27 which is held open by engagement of an arm 10 therewith when the loaf lifting apparatus is at its lowermost position, and which closes as soon as the lifting of the loaf and movement of the arm 10 away from switch 27 occurs. The other circuit wire 81 terminates at a second relay switch 82. Both relay switches 80 and 82 are closed by the energizing of a solenoid winding 84 in the length of a relay circuit wire 85, connected at opposite ends to the circuit wires 79 and 81 and in which a normally open switch 86 is interposed adapted to be momentarily closed manually for energizing the coil 84, thus closing switches at 80 and 82 which will remain closed as there will be a continuous flow of current through the winding 84 as long as switch 27 is closed. Switch 27 will remain closed until the loaf lifting apparatus has returned to its original lower position whereupon it is automatically opened and the relay circuit is interrupted, solenoid winding 84 being de-energized and the armature 83 associated therewith returned to relay switch opening position.

A circuit wire 87 is connected with the wire 85 adjacent one end of the winding 84 and leads to and has a solenoid winding 88 in its length associated with the armature 64a of valve 64. Such wire 87 is connected with the switch 82. Thus when switches 80 and 82 are closed with switch 86 opened after it has been momentarily closed to provide the closing of such switches 80 and 82, a completed circuit is made through the solenoid winding 88 with the result that the valve 64 is moved so as to provide passage of liquid from the lower end of cylinder 23 past the valve and back to the supply tank 53. The switch 80 as shown in Fig. 4 is connected with the circuit wire 87 by wire 89.

The second valve 57 is simultaneously moved to liquid passing position, a shunt circuit wire 90 is connected at its ends to the opposite side of the circuit wire 87 having a solenoid winding therein around the armature 57a operatively connected with valve 57. Thus by closing the switch 86, after the motor 50 has been stopped through opening the normally closed switch 28 upon the loaf lifter reaching its uppermost position, liquid which has been pumped into the forward end of cylinder 21 and the lower end of cylinder 23 flows back to the supply tank. From cylinder 21 the liquid returns through pipe 55 until it joins the return pipe 56 which leads to the supply tank. The liquid from the lower end of cylinder 23, following the pipe 62 to the supply tank under the pressure of the weight of the load lifting mechanism, will in part return to the supply tank. But at the beginning of return, the liquid will flow through the connecting pipe 65 to the rear end of the cylinder 21 and move the piston rod 22 forwardly to open the bread clamp to remove a sliced loaf and receive a succeeding loaf of bread. The return of the loaf lifter to its lower position continues until switch 27 is reached and is opened, thereby breaking the electric circuit of wires 79 and 81, followed by an automatic opening of the switches 80 and 82 and return of valves 57 and 64 to the position shown in Fig. 4 which blocks any further reverse or return movement of the hydraulic liquid used to the supply tank.

Switches 71 and 72 are mounted closely together and may be actuated by a longitudinally movable rod 92 balanced by springs 93 as shown in Fig. 2, so that normally the switch operating means is at neutral between the switches 71 and 72. At the start of the cycle switch 71 is closed by moving rod 92 in the proper direction and then releasing it so that such switch after being momentarily closed returns to its open position. Switch 72 in the usual operation of the machine remains closed at all times but if for any reason it is desired to stop the upward lift of the loaf lifting apparatus and the loaf carried thereby, the rod 92 is manually operated in the direction to open switch 72 which has the same effect in stopping the motor 50 as does the opening of the switch 28 which is automatically opened when the load lifting apparatus reaches its uppermost position. This is evident from the fact that switches 72 and 28 are in series in the same wire 70 of the first described circuit, so that opening either one of them stops the motor.

The switch 86, momentary closing of which manually for the return of the loaf lifting mechanism and the sliced loaf to lower position, is operated by a pivotally mounted lever 94 at the upper portion of the machine and at the side thereof opposite the rod 92. Lever 94 is connected with the switch 86 at one end and has an upwardly turned front end with a knob 95 thereon for manual operation. Switch 81 like switch 71 is manually closed momentarily and like switch 71 is returned to open position when release of the lever 94 takes place.

The cycle of operations for slicing a loaf is as follows:
With the loaf carrier at lower position and the clamping fingers 19 at forward position, as in Fig. 2, a loaf 20 is placed on the carrier against such fingers, after which switch 71 is manually closed momentarily. The motor thereupon runs, pumping oil through pipes 54 and 55 (Fig. 4) to cylinder 21, moving the loaf against the fingers 16 and clamping it between the fingers 16 and 19. Oil then under a pressure equal to the pressure in pipe 55, passes into cylinder 23 through pipe 59, restricter valve 60 and check valve 61 and the loaf carrier is lifted. There is a constant loaf clamping pressure caused by the oil pressure working against the lifting piston in cylinder 23. It is immaterial that loaves may be of different thicknesses as the clamping pressure acts on a loaf when it is forced against the fingers 16.

The motor runs until switch 28 is opened on the loaf carrier reaching its uppermost position, whereupon the motor circuit is broken and the motor stops. With armature valves 57 and 64 as in Fig. 4, return of the oil to the supply tank 53 is prevented and the loaf which has been sliced during its upward movement will be held in upper position after the motor stops until the succeeding clamp release and lowering of the loaf carrier takes place.

For such succeeding operation, switch 86 is momentarily closed by manual operation of lever 94. This causes closure of the circuits containing solenoid windings 88 and 91, causing the grooved armature valves 64 and 57 to move to oil flow freeing positions. The weight of the loaf carrier moves the piston in cylinder 21, because of pressure caused by the restricted flow at 66, the oil from the other end of cylinder 21 returning through pipes 55 and 56. On the loaf carrier reaching lowermost position (Fig. 2) it opens switch 27, breaking the solenoid circuits and placing the machine in its initial condition for a succeeding loaf slicing operation.

It is evident that with the loaf lifting apparatus in its lower position as in Fig. 2 and switch 27 being held in open position, no operation of the valves 57 and 64 can take place but that as soon as the load lifting apparatus has moved far enough to release switch 27 for closing, a subsequent manual closing of the switch 86 will open the conduits carrying the hydraulic liquid for return to the supply tank.

The structure described has been manufactured and sold and has proved exceptionally satisfactory in operation in every day use. The novel machine described is useful in the smaller bakeries where in many instances loaves of bread are sliced at the time they are sold though of course they may be sliced previous to the time of sealing. In such smaller bakeries a large quantity loaf slicing machine is not required and is generally undesired because of the large space which may be occupied by it. With my invention a very desirable, satisfactorily operating bread slicing machine is provided at reasonable cost for smaller bakeries.

The invention is defined in the appended claims and is to be considered comprehensive of all forms of structure coming within their scope.

I claim:
1. In a slicing machine having spaced movable generally horizontal bread slicers and means for movably operating said slicers, the improvement comprising, a loaf holder below said slicers having a lower supporting structure upon which the bottom of a loaf is adapted to rest, and an upwardly extending structure at the rear thereof against which the back of a loaf is adapted to press, clamping means slidably mounted on said lower supporting structure at the front of said loaf support having upwardly extending loaf engaging means, hydraulically operated means for moving the clamping means to the rear to clamp a loaf in place, and hydraulically operated means for elevating said loaf and clamping means to carry a clamped loaf to and past said slicers.

2. In a slicing machine having spaced movable bread slicers and means for movably operating said slicers, a normally open loaf clamp below said slicers pivotally mounted back of said slicers on an axis above said loaf support, means for hydraulically operating said clamp to hold a loaf therein, and means for hydraulically elevating the clamp and a loaf therein to carry said loaf upwardly to and past said slicers for transverse slicing of said loaf by the slicers.

3. In a slicing machine having spaced movable slicers, and means for movably operating said slicers, a clamp adapted to hold a loaf to be sliced below said slicers, arms pivotally mounted at their rear ends, said arms at their rear portions extending upwardly to their pivotal mounting at the front portions and above which said clamp is transversely carried, a piston pivotally mounted adjacent its lower end below said arms in front of the pivotal mountings thereof and a piston rod extending from the upper end of said piston and connected with said arms, upward longitudinal movement of which elevates said clamp, and a loaf held thereby to said slicers, for downward transverse slicing of said loaf.

4. In a slicing machine having spaced movable generally horizontal slicers, and means for movably operating said slicers, a normally open loaf holding clamp below said slicers, arms pivotally mounted at their rear ends on and above the front portions of which said clamp is carried, hydraulic piston cylinder means for closing said clamp to hold a loaf between opposite sides of the clamp, hydraulic piston cylinder means for elevating said arms, clamp and clamp operating hydraulic means toward and to said slicer, a hydraulic liquid pump, and means for substantially simultaneously conducting liquid pumped by said pump to both of said piston, cylinder means, to close said clamp and elevate it and a loaf held thereby.

5. In a slicing machine having spaced parallel elongated generally horizontal slicers at the upper front portion of the machine, and means for reciprocatingly moving said slicers, spaced arms pivotally mounted at their rear ends back of said slicers extending downwardly and thence forwardly under said slicers, a normally open loaf clamp mounted on, above and extending between the front portions of said arms, hydraulic piston cylinder means connected with said clamp for closing the clamp against opposite vertical sides of a loaf, said clamp closing means being carried by said arms, a second piston cylinder hydraulic means connected to said arms for turning said arms, clamp, loaf therein and first hydraulic means upwardly to said slicers, conduits for carrying hydraulic liquid under pressure substantially simultaneously to both piston cylinder hydraulic means, and a motor driven pump for pumping liquid through said conduits.

6. In a slicing machine having spaced movable slicers and means for movably operating said slicers, a normally open loaf clamp below said slicers, means for hydraulically operating said clamp to hold a loaf therein, means for hydraulically elevating said clamp and a loaf therein to carry said loaf to said slicers to transversely slice the loaf, a hydraulic pump, liquid carrying conduits between said pump and both of said hydraulic means, an electric motor for driving said pump, a circuit in which said motor is located, manually operable means for closing the circuit to cause operation of said motor, means in said conduit for reversing flow of liquid therein, additional switch means in said circuit operated when said clamp has been elevated to a predetermined position to stop the motor, and an additional circuit and manual switch means therein to render operative said liquid flow reversing means.

7. In a slicing machine having spaced movable slicers and means for movably operating said slicers, a normally open loaf clamp below said slicers, conduits for carrying liquid, a pump to force said liquid under pressure through said conduits, means for driving the pump, piston cylinder apparatus connected to said loaf clamp and with said conduits for moving the open clamp to loaf clamping position, means for movably mounting said clamp for movement toward and away from said slicers, a second piston cylinder apparatus connected with said conduits for moving said clamp toward said slicers, two electric circuits, an electric motor connected with said pump to drive the same in one of said circuits, means for manually closing said circuit, valves in said conduits for reversing flow of liquid therein, means for moving said valves in the other of said circuits when said circuit is closed, and means for closing said other circuit after said clamp is moved toward the slicers.

8. In a bread slicing machine having spaced movable slicers, an electric motor and means for driving said slicers from said motor, the improvement comprising, a normally open loaf clamp below said slicers having a fixed clamp member and a cooperating clamp member movable toward and away from said fixed member, hydraulic means operated by said motor for moving said movable clamp member, means for mounting said clamp for movement toward and away from said slicers, hydraulic means operated by said motor for raising and lowering said clamp, and means for reversing both hydraulic means to lower said clamp and move the movable member thereof away from the fixed clamp member after lifting said clamp to an upper position.

9. In a structure having the elements in combination defined in claim 8, means for manually starting said motor in operation, means for automatically stopping the motor when said clamp has reached uppermost position, means for manually stopping lifting the clamp before it reaches uppermost position, and means for returning the clamp to its lowermost position after it has been stopped in upward movement.

10. In a bread slicing machine having movably operating slicers and means for continuously operating said slicers, a loaf holding member below said slicers having a fixed rear clamping member and a front movable clamping member mounted for movement toward and away from said fixed member, means for moving said movable clamping member toward said fixed clamping member against a loaf between said members, mounting means for movably carrying said loaf holding member for movement upwardly to said slicers and return to initial lower position, and means for lifting said loaf holding member and a loaf held therein to said slicers and thereafter lowering it to initial lower position, said means for moving the movable clamping member toward the fixed clamping member comprising a cylinder and a piston actuated rod, said rod having connection to said movable clamping member, means for pumping liquid into said cylinder to move the movable clamping member rearwardly against a loaf between said clamping members, and means for controlling the pressure force of said liquid to maintain clamping pressure against the sides of said loaf at a substantially predetermined maximum.

11. Structure having the elements in combination defined in claim 10, and an electric motor continuously operating said slicers, a pump driven by said motor, a conduit from said pump to said cylinder, a second cylinder and piston rod, said second piston rod being connected to the movable mounting means for said loaf holding member, a second conduit carrying liquid to said second cylinder to lift the loaf holding member, said second conduit having connection to the first conduit, and liquid flow regulating means in said second conduit.

12. Structure having the elements in combination defined in claim 11, and means for reversing flow of liquid in said conduits after a lifting of said loaf holding member to an upper position.

References Cited in the file of this patent

UNITED STATES PATENTS

| | | |
|---|---|---|
| 2,290,169 | Debus | July 21, 1942 |

FOREIGN PATENTS

| | | |
|---|---|---|
| 536,278 | Great Britain | May 8, 1941 |